United States Patent

Matsushima et al.

[11] Patent Number: 5,819,583
[45] Date of Patent: Oct. 13, 1998

[54] ONE-WAY CLUTCH WITH RESILIENT RING AND STARTER USING THE SAME

[75] Inventors: Keiichi Matsushima, Toyota; Shinya Yamanouchi, Toyohashi; Tsutomu Shiga, Nukata-gun; Nobuyuki Hayashi, Nagoya; Masanori Ohmi, Anjo, all of Japan

[73] Assignee: Denso Corporation, Kariya, Japan

[21] Appl. No.: 798,140

[22] Filed: Feb. 12, 1997

[30] Foreign Application Priority Data

Feb. 26, 1996 [JP] Japan .................................. 8-037605
Mar. 21, 1996 [JP] Japan .................................. 8-064519

[51] Int. Cl.⁶ .............................. F02N 15/06; F16D 7/10
[52] U.S. Cl. .......................... 74/7 E; 74/7 C; 188/82.84; 192/45; 192/56.1; 464/37; 475/263
[58] Field of Search .................. 74/7 C, 7 E; 188/82.84; 192/45, 56.1; 464/35, 37; 475/263, 347

[56] References Cited

U.S. PATENT DOCUMENTS 3,800,925  4/1974  Luders et al. .
4,222,472  9/1980  Telford .
5,471,890  12/1995  Shiga et al. .
5,473,956  12/1995  Murata et al. .
5,549,011  8/1996   Shiga et al. .
5,706,700  1/1998   Talago et al. .............................. 74/7 C

FOREIGN PATENT DOCUMENTS 162745      4/1949   Austria .
0 529 456   3/1993   European Pat. Off. .
1150579     1/1958   France .
1 165 246   10/1958  France .
59-26107    7/1984   Japan .
182 976     8/1966   U.S.S.R. .

Primary Examiner—Allan D. Herrmann
Attorney, Agent, or Firm—Cushman Darby & Cushman IP Group of Pillsbury Madison & Sutro LLP

[57] ABSTRACT

In a one-way clutch used in a starter for engines, a locking concave for locking a roller thereto is formed on a roller-moving surface of one clutch member having a peripheral surface facing a peripheral surface of the other clutch member having a wedge-shaped groove for accommodating the roller. A resilient member for disengaging the roller from the locking concave at the time of overrunning is accommodated in an annular groove, thus urging the roller radially outwardly. The roller is prevented from colliding with the locking concave at the time of overrunning so that vibrations and noise are not generated.

27 Claims, 9 Drawing Sheets

ONE-WAY CLUTCH WITH RESILIENT RING AND STARTER USING THE SAME

CROSS REFERENCE TO RELATED APPLICATIONS

This application is based on and claims priorities of Japanese Patent Applications No. 8-37605 filed on Feb. 26, 1996 and No. 8-64519 filed on Mar. 21, 1996, the contents of which are incorporated herein by reference.

BACKGROUND OF THE INVENTION

1. Field of the Invention

The present invention relates to a one-way clutch for transmitting a torque in one direction and a starter using the one-way clutch.

2. Related Art

As a clutch for use in a starter, a roller type one-way clutch is disclosed in Japanese Utility Model Publication No. 59-26107. In this one-way clutch, each roller accommodated in a wedge-shaped space formed between an outer member and an inner member bites into the gap between the outer member and the inner member when the roller shifts to the shallow side of the wedge-shaped space, thus transmitting a torque between the two members. When the roller shifts to the deep side of the wedge-shaped space, the roller does not contact the outer member and the inner member simultaneously. In this manner, torque transmission between the outer member and the inner member is prevented.

In particular, it is proposed that when a transmitted torque exceeds a predetermined value, the outer member (or inner member) rotates slidably through the roller to prevent excess torque from being transmitted.

In this clutch, however, due to a slight fluctuation of the length of the gap between the outer member and the inner member at the end of the shallow side of the wedge-shaped space, the biting amount of the roller on the outer member (or inner member) changes. As the result, a maximum transmission torque amount fluctuates greatly.

In order to solve this problem, Japanese Patent Application No. 6-213707 which corresponds to U.S. application Ser. No. 08/381,498 filed on Jan. 31, 1995 proposes another roller type one-way clutch in which a locking concavity is formed on the peripheral surface of either an outer member or an inner member is proposed. A wedge-shaped groove accommodating a roller is formed on the inner peripheral surface of the outer member, and locking grooves for locking the roller are formed on the peripheral surface of the inner member. The roller engages one of the locking grooves during torque transmission. When a torque greater than a predetermined value is applied to the outer member, the roller shifts to the next locking groove.

In the one-way clutch provided with the locking concavity, however, a shock is applied to the roller due to the irregularities of the locking concavity at the time of over-running. As a result, there is a possibility that the roller, the inner member, and the outer member are damaged, and noises and vibrations are generated.

Further, in the conventional roller type one-way clutch having no locking concavities, the maximum transmission torque amount depends on the friction coefficient between the cylindrical roller-moving surface and the roller. Thus, it is not easy to adjust the friction coefficient and prevent the changes thereof with the elapse of time. Further, if the friction coefficient is too great, abrasion of the roller and the like increases, whereas if the friction coefficient is too small to reduce the abrasion thereof, the maximum transmission torque cannot be obtained as desired.

SUMMARY OF THE INVENTION

The present invention has an object of providing a one-way clutch capable of preventing damage of rollers while it secures a preferable torque transmission characteristic.

The present invention has another object of providing a one-way clutch capable of suppressing generation of noises and vibrations.

The present invention has a further object of providing a starter using the one-way clutch.

According to the present invention, a locking concavity which engages a roller is formed on either the inner peripheral surface of a clutch outer member or on the peripheral surface of a clutch inner member. A resilient member is disposed to bias the roller in a radial direction thereof. At a normal torque transmission time, the roller is positioned at a shallow side of the wedge-shaped groove and contacts the peripheral surface of the locking concavity, thus transmitting a torque from the outer member to the inner member and vice versa. During overrunning, the resilient member shifts the roller to a deep side of the wedge-shaped groove, thus disengaging the roller from the locking concavity.

The resilient member urges the roller toward the wedge-shaped groove, namely, outwardly in the radial direction thereof. Consequently, even though shocks or vibrations are applied or the degree of a transmitted torque changes rapidly, the roller can be prevented from being shaken or moving out from the wedge-shaped groove. In this manner the torque transmission can be accomplished without too much noises.

Preferably, the locking concavity is formed on the inner member so that a centrifugal force is generated in the resilient member during a high speed rotation. Thus, there is an increase in the force of the resilient member of urging the roller in the centrifugal direction, namely, in the direction in which the roller disengages from the locking concavity in correspondence with the generation of the centrifugal force in the resilient member. Accordingly, the resilient member disengages the roller smoothly from the locking concavity by that much, thus reducing the degree of abrasion of the roller and the generation of abnormal sounds.

Preferably, the resilient member is made of a resilient metal ring accommodated in an annular groove formed on the other of the inner peripheral surface of the outer member and the peripheral surface of the inner member so that resiliency can be imparted to a plurality of rollers provided thereon although the one-way clutch has a simple construction.

Preferably, the radial depth of the annular groove from the deepest bottom of the locking concavity is smaller than the thickness of the resilient ring so that the roller is kept radially above the deepest bottom of the locking concavity when the roller is received in the locking concavity during torque transmission.

Preferably, at least one pair of the resilient members is formed such that the resilient member contacts both sides of the peripheral surface of the roller. Thus, a partial abrasion of the roller can be prevented.

Preferably, the annular groove is formed to have a radial depth gradually becoming deeper from an axial end side of the inner member and only an axially inside part of the resilient ring contacts an axial end part of the resilient ring. Thus, only the axially inside part is resiliently deformed in the annular groove.

Preferably, the one-way clutch is used in a starter for an engine to prevent the overrunning of the starter provided with an epicyclic gear reduction mechanism.

BRIEF DESCRIPTION OF THE DRAWINGS

Other objects, features and advantages of the present invention will become more apparent from the following detailed description when read with reference to the accompanying drawings, in which.

DETAILED DESCRIPTION OF PRESENTLY PREFERRED EMBODIMENTS

Figure 1:
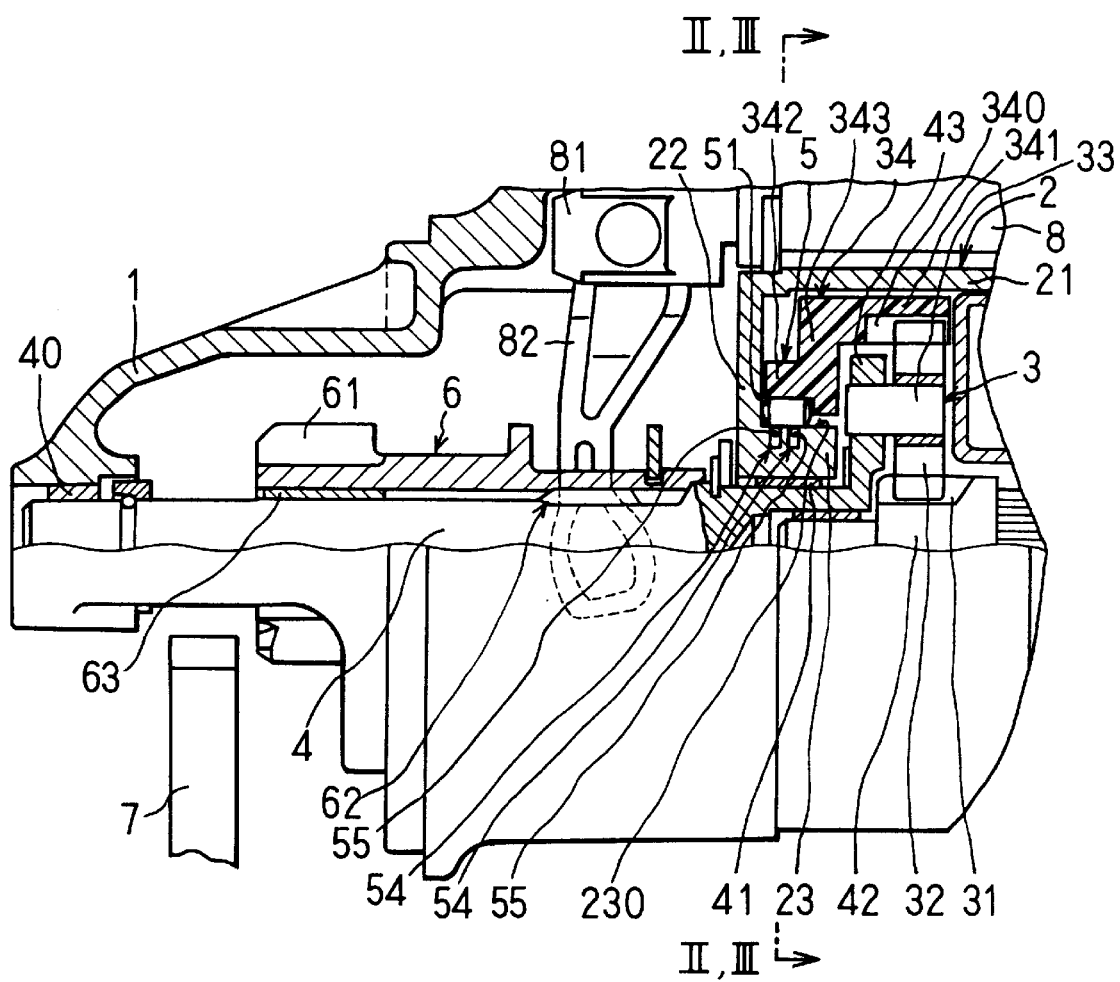
FIG. 1 is a partial sectional view showing a starter using a one-way clutch according to a first embodiment of the present invention.

Preferred embodiments of the present invention will be described below in detail with reference to the accompanying drawings in which same reference numerals are used to denote the same or equivalent parts.

(First Embodiment)

In FIGS. 1 through 5, a starter has a housing 1 and a center casing 2 fixed to the housing 1 and accommodating an epicyclic gear reduction mechanism 3. A driving shaft (output shaft of starter) is rotatably supported by the housing 1 at its front end and by the center casing 2 through bearings 40 and 41, respectively. A concavity is formed at the rear end of the driving shaft 4. The concavity supports the front end of a rotation shaft 42 of a motor rotatably along the axis of the driving shaft 4 through a bearing.

A sun gear 31 of the epicyclic gear reduction mechanism 3 is formed at the front end of the rotation shaft 42. Planetary gears 32 engage the sun gear 31 such that the planetary gears 32 revolve around the sun gear 31. The planetary gears 32 are rotatably supported by respective pins 33 through respective bushings. The pins 33 are fixed to a large-diameter portion 43 formed at the rear end of the driving shaft 4. An internal gear 34 made of resin and surrounding the planetary gears 32 is provided such that the internal teeth 340 of the internal gear 34 are meshed with the planetary gears 32. The internal gear 34 comprises a large-cylindrical portion 341 having the internal teeth 340 formed thereon, a small-cylindrical portion 342 positioned in front of and adjacent to the large-cylindrical portion 341, and a wall portion 343 disc-shaped and connecting the large-cylindrical portion 341 and the small-cylindrical portion 342 with each other, thus having a stepped cylindrical shape. The small-cylindrical portion 342 constitutes an outer member (clutch outer member) of a one-way clutch 5.

The center casing 2 comprises a large-cylindrical portion 21, an end wall portion 22 which closes the front end of the large-cylindrical portion 21, and a small-cylindrical portion 23 projecting rearward axially from the radial inner end of the end wall portion 22. The small-cylindrical portion 23 constitutes an inner member (clutch inner member) of the one-way clutch 5 and serves as a bearing cylindrical portion supporting the driving shaft 4.

A pinion 6 is mounted on the driving shaft 4 by means of a spline-fit-in such that the pinion 6 is nonrotatable relative to the driving shaft 4 and movable relative thereto in the axial direction thereof. A pinion gear 61 capable of engaging a ring gear 7 is formed on the peripheral surface of the pinion 6 at the front end thereof. Reference numeral 62 denotes a spline-fit-in portion, and 63 denotes a bearing.

A magnet switch 8 is fixed to an upper portion of the housing 1. When a plunger (not shown) of the magnet switch 8 moves rearward (right-hand direction in FIG. 1), the pinion 6 is moved forward through a lever 82.

Figure 2:
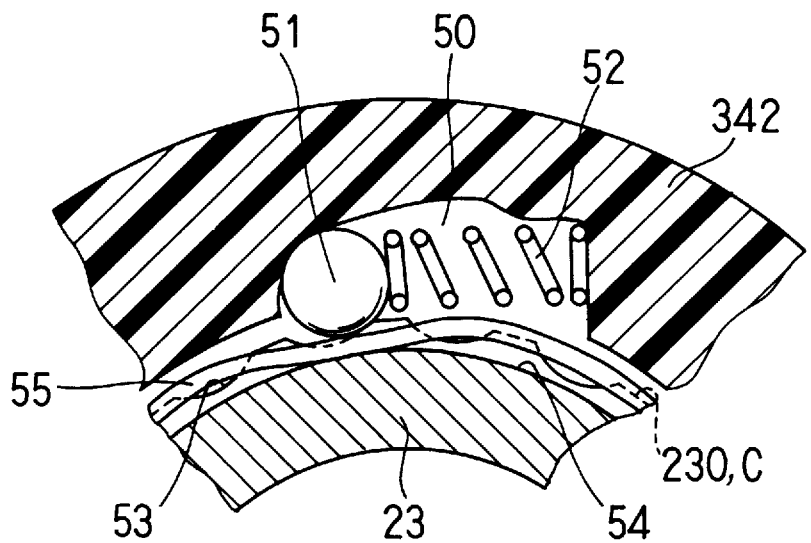
FIG. 2 is a sectional view showing a normal torque transmission state of the one-way clutch according to the first embodiment.
Figure 3:
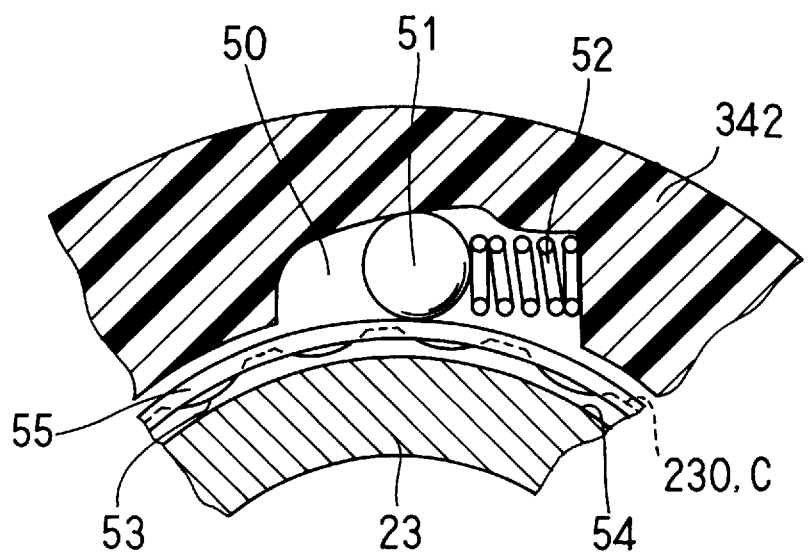
FIG. 3 is a sectional view showing an overrunning state of the one-way clutch according to the first embodiment.

As shown in FIGS. 2 and 3, a predetermined number of wedge-shaped grooves 50 is formed at predetermined angular intervals on the inner peripheral surface of the outer member 342. Each wedge-shaped groove 50 accommodates a roller (clutch roller) 51 and a spring (clutch spring) 52 as a pair. The bottom surface of the wedge-shaped groove 50 is concave continuously deeply from the left-hand side to the right-hand side in the Figures. An end wall for locking the roller 51 is formed at each of both ends of the wedge-shaped groove 50. The roller 51 is urged to the shallow side of the wedge-shaped groove 50 by the spring 52 to be pressed in a radially inward direction.

Figure 4:
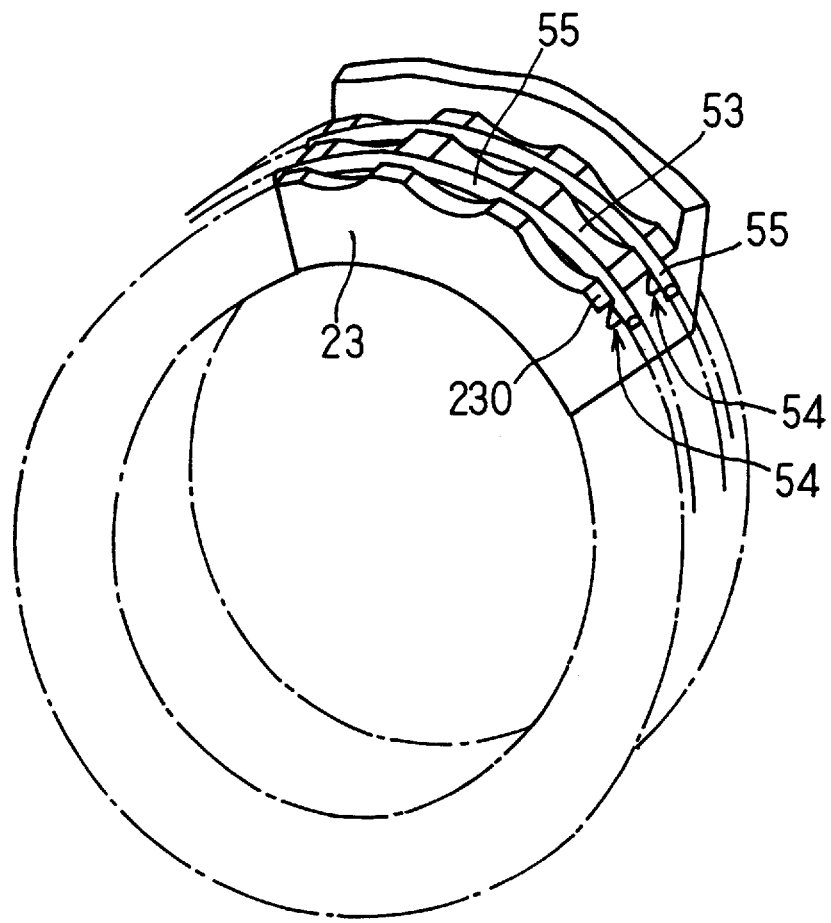
FIG. 4 is a perspective view showing an inner member of the one-way clutch according to the first embodiment.
Figure 5:
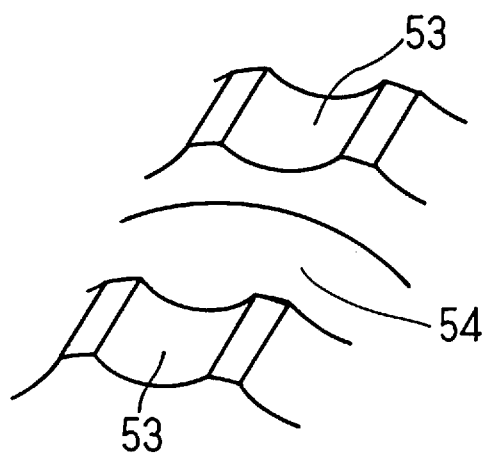
FIG. 5 is an enlarged perspective view showing a part of the inner member shown in FIG. 4.

Locking concavities 53, the number of which is more than that of the rollers 51 are circumferentially formed at regular intervals on the peripheral surface (roller-moving surface) 230 of the inner member 23. As shown in FIGS. 4 and 5 further, a pair of annular grooves 54 are formed on the entire peripheral surface 230 of the inner member 23. Each annular groove 54 accommodates a ring (resilient member) 55 made of highly-resilient metal and is formed deeper than the locking concavity 53. The inner diameter of the ring 55 is larger than the diameter of the groove 54, and the thickness of the ring 55 is larger than the radial depth between the surface of the groove 54 and the deepest bottom of the concave 53. Thus, the outer periphery of the ring 55 becomes higher than the top 230 (C) of the inner member 23.

When the outer member 342 rotates clockwise relative to the inner member 23, as shown in FIG. 2, the roller 51 curves the ring 55 radially inwardly, thus contacting the end wall of the wedge-shaped groove 50 at its shallow side and the peripheral surface of the locking concavity 53 at its shallow side. Consequently, the clockwise normal torque of the outer member 342 is transmitted from the bottom surface and the end wall of the wedge-shaped groove 50 at the shallow side thereof to mainly the end of the peripheral surface of the locking concavity 53, at its shallow side, of the inner member 23 through the roller 51. Because the inner member 23 is a fixed member, the torque is transmitted from the planetary gears 32 to the driving shaft 4 by restricting the rotation of the outer member 342. Accordingly, in the transmission of the normal torque, the ring 55 is curved and kept above the deepest bottom of the concavity 53, thus pressing the roller 51 against the bottom surface of the wedge-shaped groove 50 to prevent the roller 51 from being shaken and moved out from the wedge-shaped groove 50. In addition, the ring 55 allows the roller 51 to move away from the locking concavity 53 rapidly at the time of overrunning and the application of an excess torque which will be described later. In the transmission of the normal torque, rotation of the outer member 342, the ring 55 is curved greatly. Thus, the ring 55 follows the shift of the roller 51, thus rotating in the annular groove 54 relative to the inner member 23.

In this embodiment, the outer diameter of the ring 55 is set to be slightly larger than that of the roller moving surface or top 230 of the inner member 23. That is, the outer circumference of the ring 55 lies radially above the top C of the locking concavity 53. Consequently, when an overrunning occurs and when the outer member 342 rotates counterclockwise relative to the inner member 23, as shown in FIG. 3, the roller 51 moves to the deep side of the wedge-shaped groove 50 while the roller 51 is compressing the spring 52 by the frictional resistance to the ring 55 and a centrifugal force applied thereto, thus eliminating the curve of the ring 55 and moving out from the locking concavity 53 radially outwardly. As a result, the roller 51 slides on the outer peripheral surface of the ring 55 in contact therewith, and the ring 55 rotates smoothly relative to the inner member 23, thus preventing the torque transmission between the outer member 342 and the inner member 23.

When an excess torque is applied in the torque transmission direction, i.e., when the resistance to the rotation of the rotary member, namely, when the resistance to the rotation of the outer member 342 or the inner member 23 at the driven side is great, the roller 51 is pressed against the outer member 342 made of resin and resiliently deforms radially outwardly, and the roller 51 moves past the peripheral surface of the locking concavity 53. As a result, the roller 51 and the outer member 342 rotate (idle) clockwise relative to the inner member 23, thus preventing the transmission of a torque higher than a predetermined level. At this time, each roller 51 drops into the corresponding locking concavity 53 sequentially. Because the roller 51 is always urged radially outwardly by the curved part of the ring 55, the roller 51 is not greatly shaken radially. Thus, a high degree of noise is not generated.

Because at least a pair of the rings 55 is formed axially at a predetermined interval, the ring 55 prevents one side of the roller 51 from dropping below the other side thereof and thus a partial abrasion of the roller 51 can be prevented.

Upon start of rotation of the sun gear 31 due to application of electricity to the motor, the planetary gears 32 of the epicyclic gear reduction mechanism 3 revolve around the sun gear 31 and thus the driving shaft 4 and the pinion 6 rotate. When the magnet switch 8 causes the pinion 6 to move forward through the lever 82, the pinion 6 engages the ring gear 7 to drive the engine. At this time, the torque in the normal torque transmission direction is applied to the internal gear 34 from the planetary gears 32. The internal gear 34 is kept stationary because the inner member 23 is stationary. When resistance to the rotation of the driving shaft 4, namely, resistance to the rotation of the planetary gears 32 around the sun gear 31 becomes great due to a re-start which is made immediately after a failure of the engagement between the pinion 6 and the ring gear 7 although the sun gear 31 is still in inertial rotation, the rotating planetary gears 32 drive the internal gear 34. Consequently, the outer member 342 rotates (forcibly rotated in the torque transmission direction), thus preventing the generation of an excessive shock from occurring by the engagement between the pinion 6 and the ring gear 7. Upon start of the engine, the ring gear 7 rotates the driving shaft 4 through the pinion 6 in the rotational direction of the sun gear 31 at a speed higher (overrunning state) than that of the sun gear 31. As a result, because the one-way clutch 5 becomes free as described above, the motor can be prevented from being rotated at a high speed.

In this embodiment, when an overrunning state occurs, a centrifugal force is applied to the roller 51 which starts to rotate together with the internal gear 34. As a result, the roller 51 is shifted in the clutch connection-release direction along the wedge-shaped groove 50. Therefore, the shift to the overrunning state can be smoothly accomplished.

(Second Embodiment)

The second embodiment is substantially identical to that of the first embodiment (FIG. 1) except that the mounting position of the one-way clutch of the second embodiment is altered from that of the one-way clutch of the first embodiment.

Figure 6:
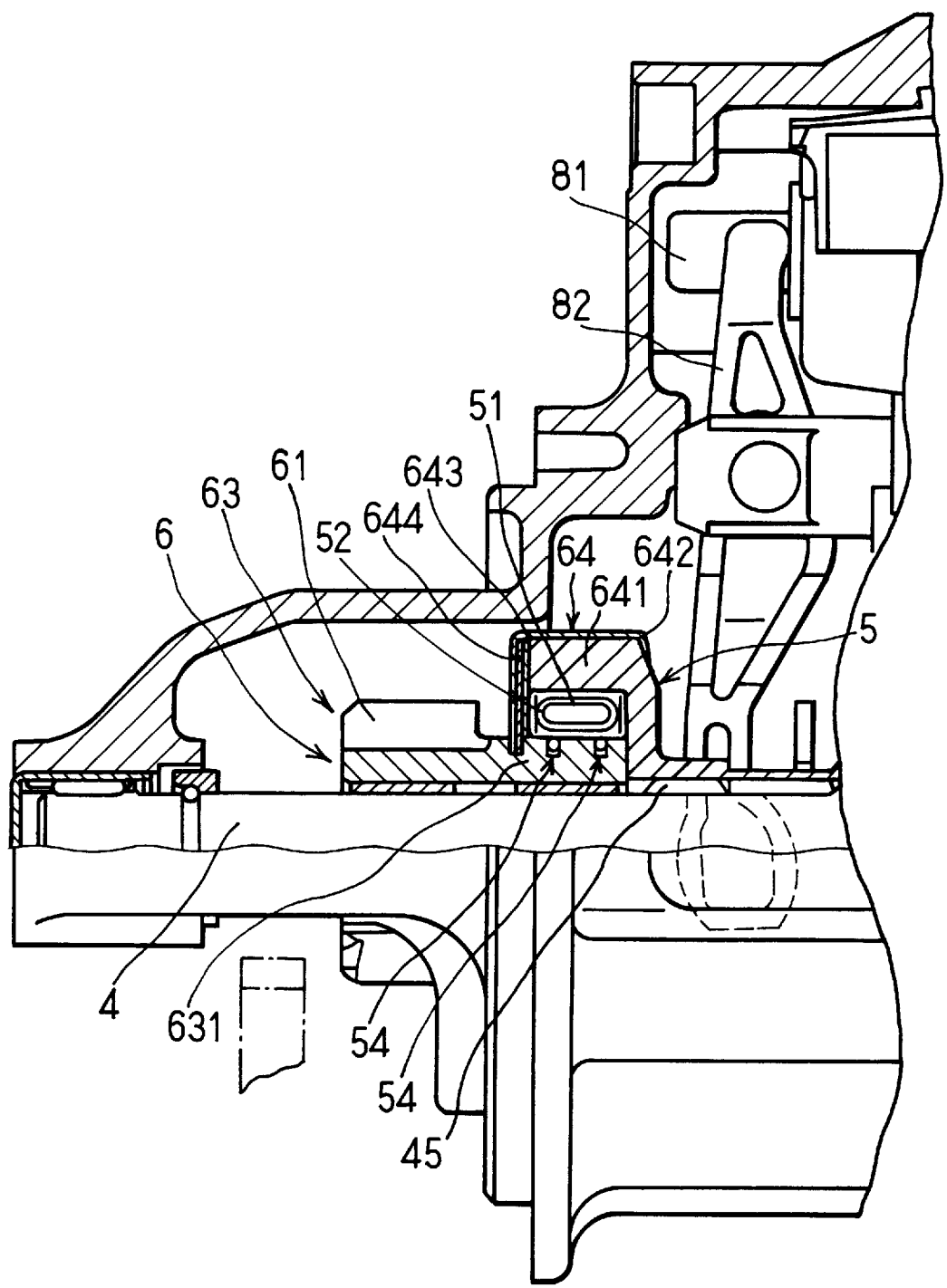
FIG. 6 is a partial sectional view showing a front half of a starter using a one-way clutch according to a second embodiment of the present invention.
Figure 7:
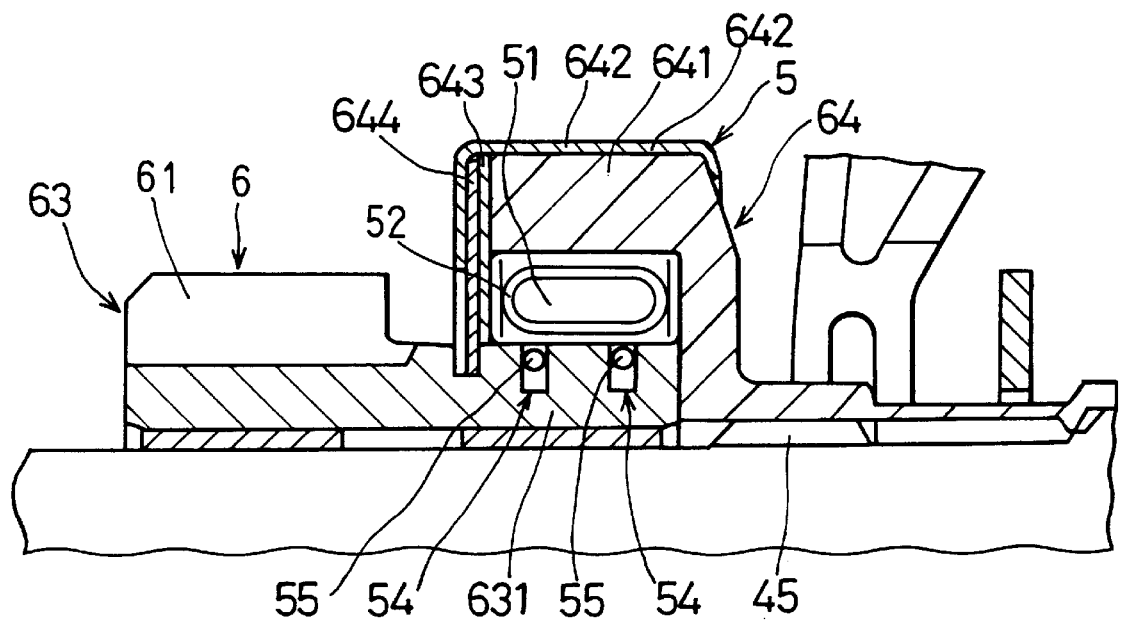
FIG. 7 is a sectional view showing a pinion shown in FIG. 6.

As shown in FIGS. 6 and 7, a pinion member 6 having a pinion tube 63 made of metal and a spline tube 64 located behind the pinion tube 63 is fitted into the driving shaft 4. A pinion gear 61 is formed at the front end of the peripheral surface of the pinion tube 63. The rear part of the pinion tube 63 constitutes the inner member of a one-way clutch 5. The pinion tube 63 is axially movable relative to the driving shaft 4 and rotatable relative thereto through a bearing. A large-diameter front part 641 of the spline tube 64 constitutes the outer member of the one-way clutch 5, whereas a rear part of the spline tube 64 is mounted on the driving shaft 4 by a spline-fit-in at a spline-fit-in portion 45 of the driving shaft 4. Similarly to the first embodiment, a roller 51, a ring 55, a wedge-shaped groove (not shown), a locking concavity (not shown), and a pair of annular grooves 54 are formed in the gap, between the outer member 641 and the inner member 631, in the radial direction thereof. There are provided a cover 642 fixed to the periphery of the outer member 641 and a washer 643 closing the opening of the outer member 641. Another washer 644 positioned in front of and adjacent to the washer 643 is fitted in annular grooves, thus preventing the roller 51 and grease from moving to the outside and securing shift thereof together with the outer member 641 and the inner member 631 in the axial direction of the driving shaft 4.

(Third Embodiment)

Figure 8:
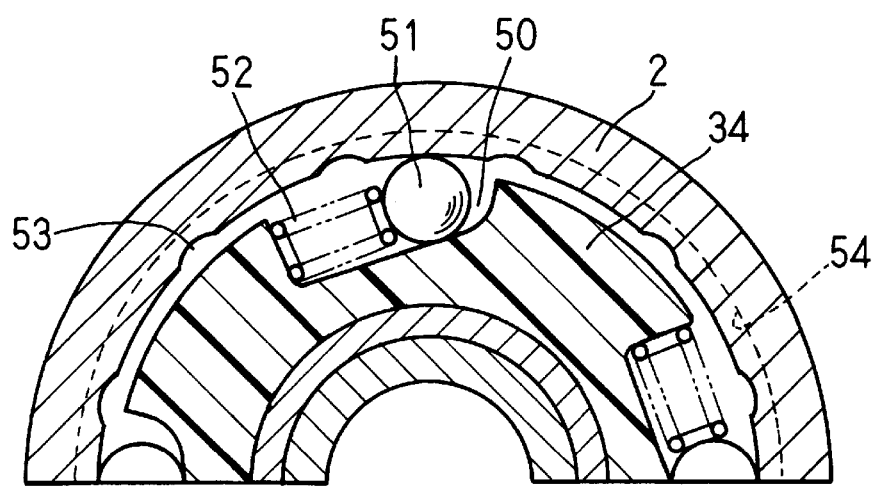
FIG. 8 is a sectional view showing a part of a one-way clutch according to a third embodiment of the present invention.

The third embodiment is substantially the same as the first embodiment except that an inner member is formed integrally with an internal gear 34 (FIG. 1). As shown in FIG. 8, an outer member is formed integrally with the center casing 2. Wedge-shaped groove 50 accommodating the roller 51 and the spring 52 is formed on the inner member 23. A locking concavity 53 is formed on the outer member 65.

(Fourth Embodiment)

The fourth embodiment is a modification of the second embodiment shown in FIGS. 6 and 7. That is, merely the shape of the annular groove 54 of the one-way clutch 5 shown in FIG. 7 and that of the ring 55 are modified.

Figure 9:
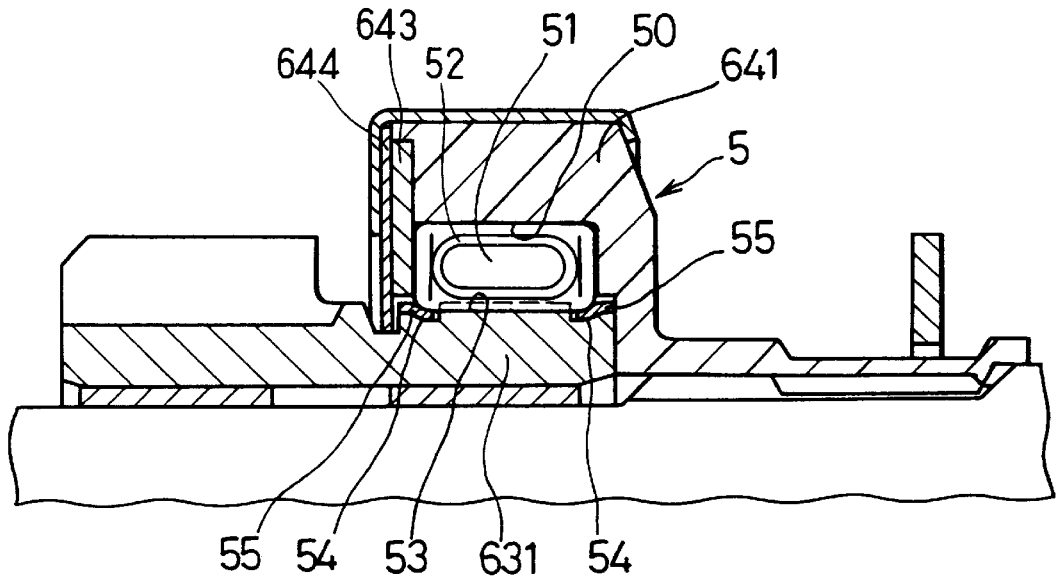
FIG. 9 is a sectional view showing a clutch-connected state of a one-way clutch according to a fourth embodiment of the present invention.
Figure 10:
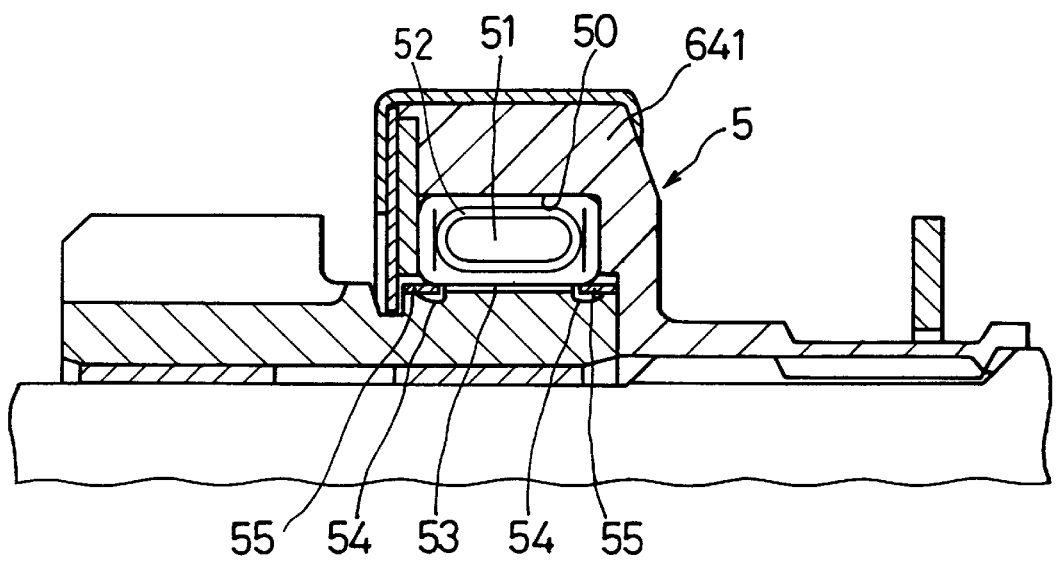
FIG. 10 is a sectional view showing an overrunning state of the one-way clutch according to the fourth embodiment.

In this embodiment, as shown in FIGS. 9 and 10, a pair of annular grooves 54 is formed at both axial ends of the peripheral surface of an inner member 631 in such a manner that the annular grooves 54 confront both ends of a roller 51. In the sectional view of the annular grooves 54 in the axial direction of the one-way clutch 5, the annular grooves 54 are concave gradually deeper from both axial ends of the inner member 631 to its center. Ring 55 made of resilient metal are cylindrically plate-shaped and fitted in the annular grooves 54. The inner peripheral surface of the rings 55 are in close contact with both ends of the inner member 631. A locking concavity 53 is formed at the center of the inner member 631.

As shown in FIG. 9, in a torque transmission state, because the roller 51 is positioned at the shallow side of a wedge-shaped groove 50 of the outer member 641, the roller 51 shifts radially inwardly, thus engaging a locking concavity 53 of the inner member 631, whereas the ring 55 is curved radially inwardly, thus urging the roller 51 radially outwardly. In an overrunning state, as shown in FIG. 10, because the roller 51 is positioned at the deep side of the wedge-shaped groove 50 of the outer member 641, the roller 51 shifts radially outwardly and is urged radially outwardly by the ring 55. As a result, the roller 51 is kept in a state in which it is in disengagement from the locking concavity 53. Thus, the roller 51 can be prevented from engaging the locking concavity 53.

(Fifth Embodiment)

The fifth embodiment is a modification of the one-way clutch of the first embodiment.

Figure 11:
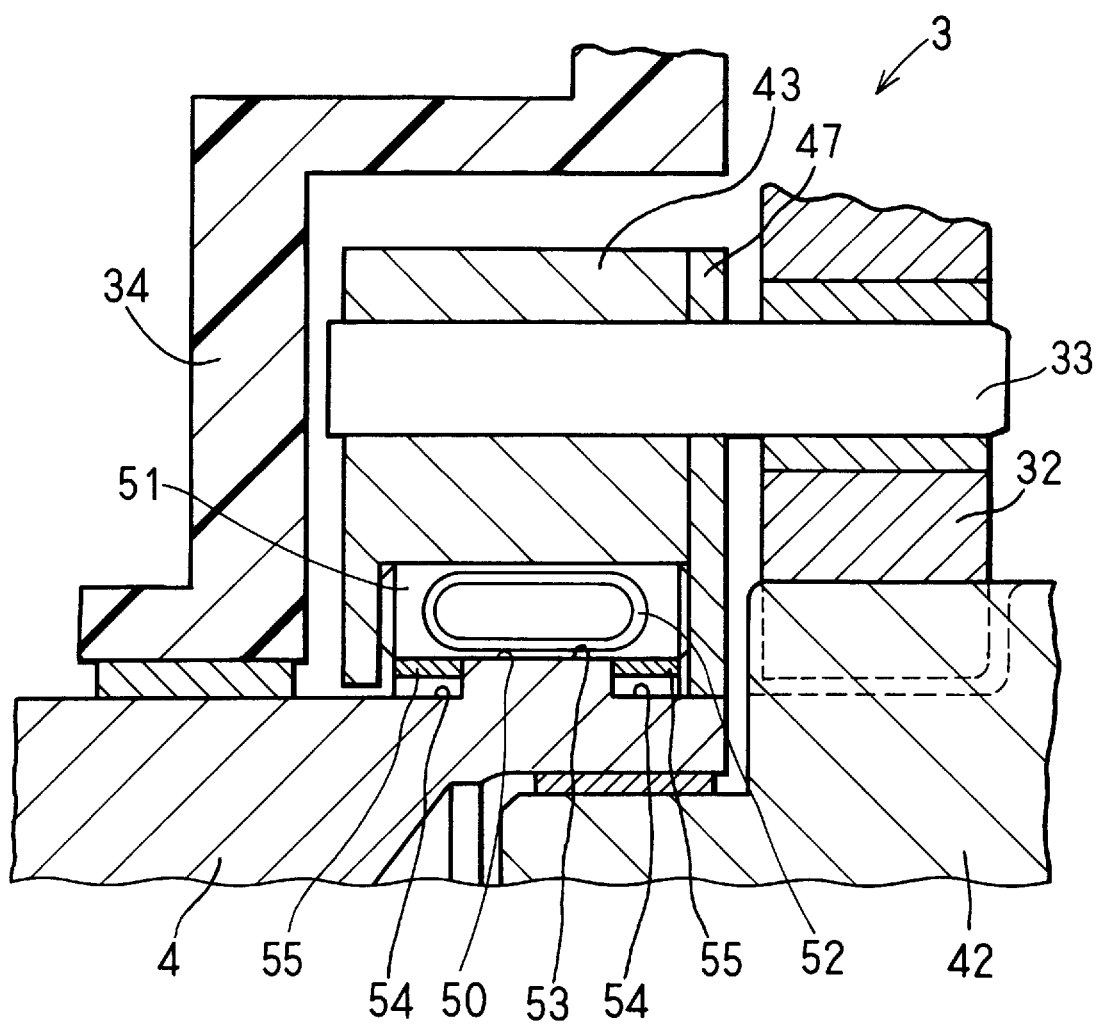
FIG. 11 is a sectional view showing a one-way clutch according to a fifth embodiment of the present invention.

As shown in FIG. 11, an epicyclic gear reduction mechanism 3 of this embodiment is similar to that provided with the one-way clutch shown in FIG. 1 except that the one-way clutch is installed between the inner peripheral surface of a planetary gear-supporting cylinder corresponding to the large-diameter portion 43 shown in FIG. 1 and the peripheral surface of a driving shaft 4 in which the planetary gear supporting cylinder 43 is fitted.

In more detail, the driving shaft 4 is rotatably supported by a center casing not shown in FIG. 11 through a bearing, and an internal gear 34 is rotatably supported by the driving shaft 4 through a bearing.

Planetary gears 32 engaging a sun gear of an armature rotation shaft 42 are rotatably supported by respective pins 33 through respective bushings, and the pins 33 are inserted into the planetary gear-supporting cylinder 43 under pressure. The planetary gear supporting cylinder 43 is rotatably fitted in the rear end of the driving shaft 4. The inner peripheral surface of the planetary gear supporting cylinder 43 has a wedge-shaped groove 51, thus constituting an outer member. Similarly to FIG. 9, a locking concavity 53 is formed at the center of the rear end of the driving shaft 4 (an inner member) in the axial direction thereof. An annular groove 54 in which a ring 55 is fitted is formed at both axial sides of the inner member.

A ring plate 47 is fixed to the cylinder 43 for preventing the roller 51 or the like from being moved out from the wedge-shaped groove 50.

(Sixth Embodiment)

The sixth embodiment is a modification of the fourth embodiment shown in FIGS. 9 and 10.

Figure 12:
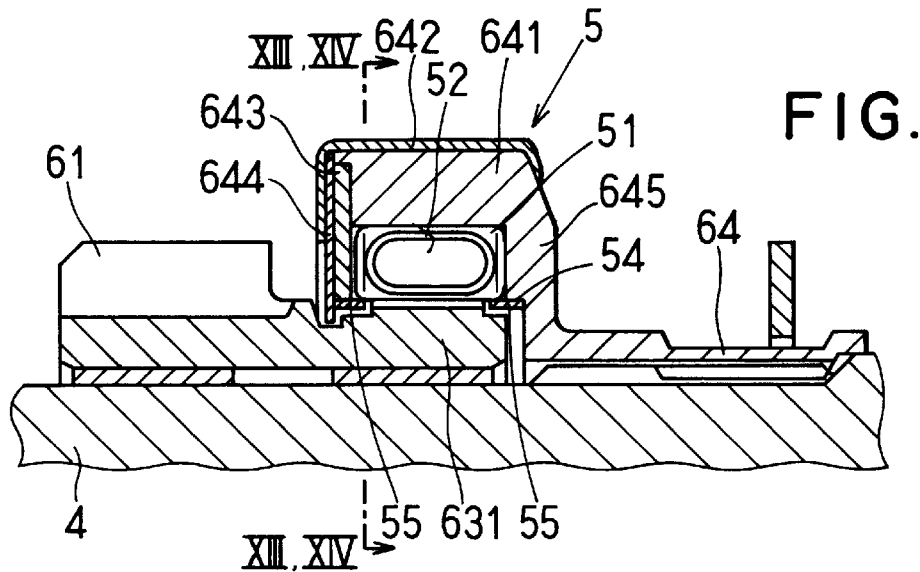
FIG. 12 is a partial sectional view showing a starter using a one-way clutch according to a sixth embodiment of the present invention.

As shown in FIG. 12, two resilient metal rings 55 are disposed to contact the axial end parts of a roller 51, thus preventing inclination of the roller 51 and assuring stable operation of the one-way clutch 5. About one half width (axial length) of each ring 55 extends axially outside from the end face of the roller 51. The radially outer periphery of the extended part of the ring 55 is normally or under the stationary condition in contact with the radially inner peripheries of a side wall 645 of an outer member 641 (spline tube 64) and a plate washer 643. This arrangement restricts deformation of the ring 55 caused by the centrifugal force at the time of overrunning state, while assuring the one-way clutch operation. The restriction of the inner peripheries of the side wall 645 and the washer 643 help the ring 55 to be placed in position with its radial center becoming coaxial with a driving shaft 4, so that the roller 51 may be placed evenly axially in a wedge-shaped groove 50 and that the inner member 631 and the outer member 641 may be kept in the coaxial relation to each other at the overrunning state. With the outer periphery of the ring 55 being in contact with the side wall 645 and the washer 643, even when the inner member 631 is driven by an engine in the overrunning state and rotates at higher speeds, the outer member 641 driven by a starter motor rotates idly. Therefore, the influence of the centrifugal force is reduced and the abnormal deformation of the ring can be prevented.

Figure 13:
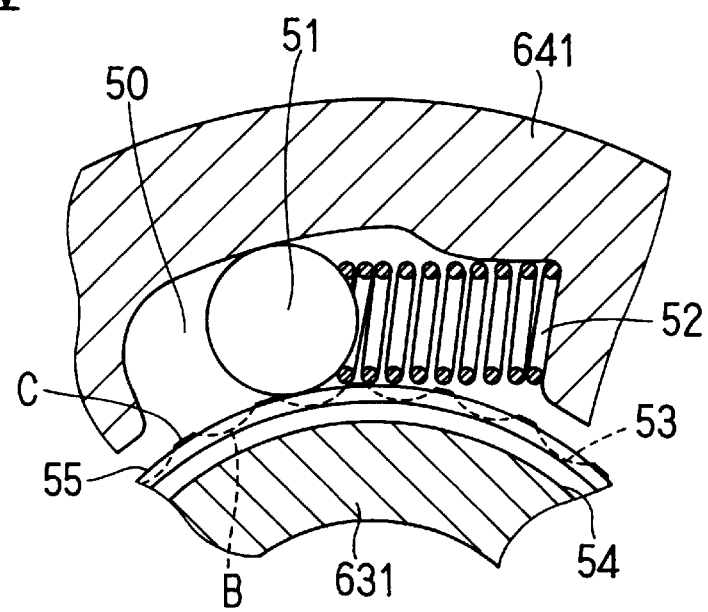
FIG. 13 is a sectional view showing a torque transmission state of the one-way clutch according to the sixth embodiment.

Further as shown in FIGS. 12 and 13, the ring 55 is placed in an annular groove 54 of the inner member 631 so that the radial outer periphery of the ring 55 normally resides between the radially highest part (top) C and the radially lowest part (bottom) B of the locking concavity 53. At the time of overrunning, the ring 55 having been bent or curved by the roller 51 received in the locking concavity 53 during the torque transmission state (engine starting operation state) tends to move the roller 51 radially outwardly by its own resiliency, thereby disengaging the roller 51 from the locking concavity 53. As a result, the contact resistance between the inner member 631 and the outer member 641 is reduced, the collision of the roller 51 with the locking concavity 53 can be reduced and the movement of the roller 51 can be stabilized, resulting in reduction of friction noise during overrunning. Further, not only can the deformation of roller 51 be reduced but also fatigue of a spring 52 caused by the movement of the roller 51 can be reduced.

(Seventh Embodiment)

Figure 14:
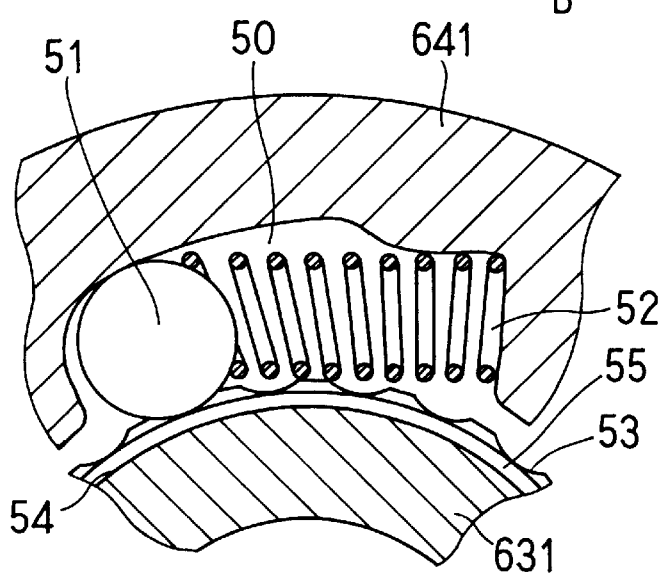
FIG. 14 is a sectional view showing an overrunning state of the one-way clutch according to the sixth embodiment.

The seventh embodiment is a modification of the sixth embodiment shown in FIGS. 12 through 14.

Figure 15:
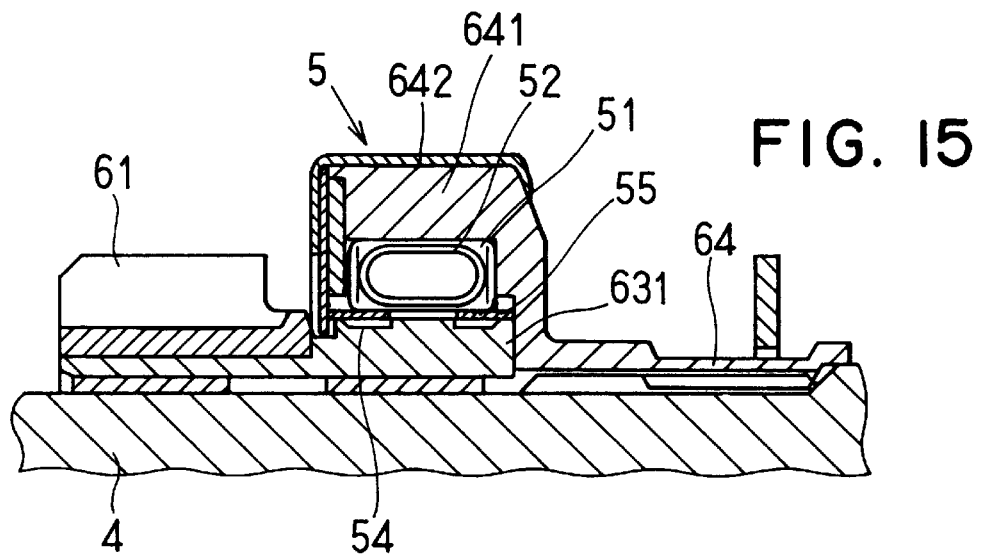
FIG. 15 is a partial sectional view showing a starter using a one-way clutch according to a seventh embodiment of the present invention.

In this embodiment, as shown in FIG. 15, a resilient annular ring 55 is press-fitted to an inner member 631 for rotation therewith. That is, about one half width of each ring 55 is fixed to the outer periphery of the inner member 631 and the remaining half is held above an annular groove 54 to be curved by a roller 51 radially inwardly during the torque transmission state. Further as shown in FIG. 16, the radially outer periphery of the ring 55 normally resides radially outside the highest part (top) C of the locking concavity 53.

According to this embodiment, only about one half of the ring 55, i.e., the axially inside part contacting the axial end part of the roller 51, resiliently deforms between the torque transmission state and the overrunning state with the axially outside part of the ring 55 being continuously fixed to the inner member 631. Therefore, even when the centrifugal force exerted on the ring 55 at the time of overrunning, the annular ring 55 can keep its ring shape and is not deformed eccentrically, thus preventing unstable operation of the roller 51. Further, with the outer periphery of the ring 55 being maintained above the highest part C of the locking concavity 53, the roller 51 can move in the wedge-shaped groove 51 without hitting or colliding with the highest part C.

(Eighth embodiment)

Figure 16:
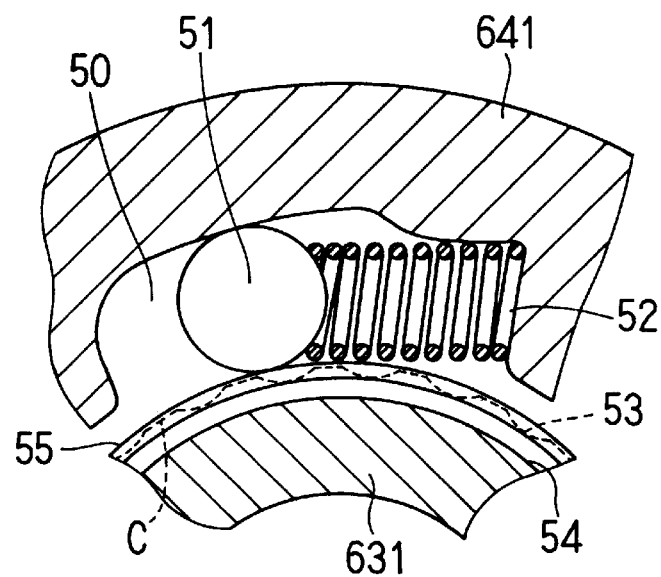
FIG. 16 is a sectional view showing the one-way clutch according to the seventh embodiment.

The eighth embodiment is a modification of the seventh embodiment shown in FIGS. 15 and 16.

Figure 17:
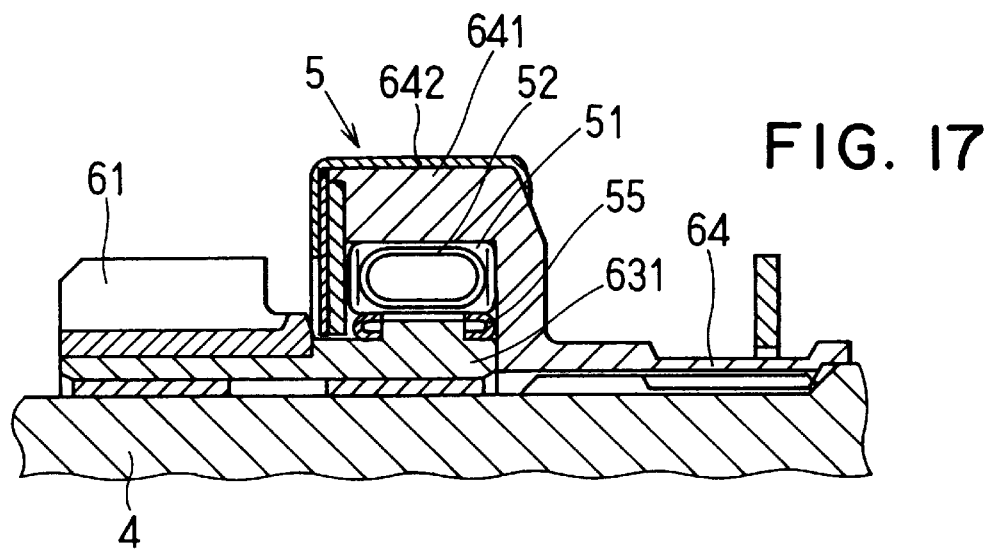
FIG. 17 is a partial sectional view showing a starter using a one-way clutch according to an eighth embodiment of the present invention.

In this embodiment, as shown in FIG. 17, each resilient metal ring 55 is formed with a U-shaped cross section. The radially inner periphery and the radially outer periphery of the ring 55 is fixed to the annular groove of the inner member 631 and is held in sliding contact with the roller 51, respectively. The ring 55 may alternatively be formed in a disk spring shape so that its small diameter side is fixed to the inner member 631 and its large diameter side is held in sliding contact with the outer member 641.

The foregoing embodiments are not restrictive but may be modified further without departing from the spirit and scope of the invention.

What is claimed is:

1. An apparatus comprising:
an outer member and an inner member rotatable relative to each other and opposed to each other with a predetermined interval in a radial direction therebetween;
a wedge-shaped groove formed on one of an inner peripheral surface of the outer member and an outer peripheral surface of the inner member such that the depth of the wedge-shaped groove increases from one side to the other side in a circumferential direction;
an annular groove formed on another of the inner peripheral surface of the outer member and the outer peripheral surface of the inner member;
a roller movably accommodated in the wedge-shaped groove for connecting the outer member and the inner member with each other at a shallow side of the wedge-shaped groove so as to transmit a torque and for disconnecting the outer member and the inner member from each other at a deep side of the wedge-shaped groove;
a locking concavity formed on said another of the inner peripheral surface of the outer member and the outer peripheral surface of the inner member for locking the inner roller thereto when the outer member and the inner member are connected with each other; and
a resilient member disposed on said another of the inner peripheral surface of the outer member and the outer peripheral surface of the inner member for shifting the roller to a position at which the roller does not contact a radial top of the locking concavity when the outer member and the inner member are disconnected from each other.

2. The apparatus according to claim 1, wherein:
the resilient member is disposed to keep the roller from a radial bottom of the locking concavity when the roller is received in the locking concavity so that the outer member and the inner member are connected with each other.

3. The apparatus according to claim 1, wherein:
the locking concavity is formed on the inner member circumferentially.

4. The apparatus according to claim 1, wherein:
the roller is disposed to disengage from the locking concavity due to a resiliency of the resilient member when a torque greater than a predetermined amount is applied in a torque transmission direction.

5. The apparatus according to claim 1,
wherein the resilient member includes a resilient ring accommodated in the annular groove.

6. The apparatus according to claim 1, further comprising at least one additional resilient member, the resilient member and the at least one additional resilient member forming a plurality of resilient members and being disposed at a plurality of locations spaced apart from one another in the axial direction of the outer member and the inner member such that the plurality of resilient members contact at least both axial sides of the roller.

7. The apparatus according to claim 1, wherein:
at least one additional wedge-shaped groove is formed on the same surface as the wedge-shaped groove, the wedge-shaped groove and the at least one additional wedge-shaped groove forming a plurality of wedge-shaped grooves, each groove in said plurality of wedge-shaped grooves having a corresponding roller movably accommodated therein;
at least one additional locking concavity is formed on said another of the inner peripheral surface of the outer member and the outer peripheral surface of the inner member, the locking concavity and the at least one additional locking concavity forming a plurality of locking concavities; and
the number of the locking concavities in said plurality of locking concavities is greater than the number of rollers in said plurality of rollers.

8. The apparatus according to claim 1, further comprising:
a motor having an armature rotation shaft;
a casing; and
an epicycle gear reduction mechanism having a sun gear formed on the armature rotation shaft, a driving shaft coaxial with the armature rotation shaft, an internal gear disposed in the casing and surrounding a peripheral surface of the sun gear, planetary gears rotatably supported by the driving shaft and engaging the sun gear and the internal gear,
wherein the outer member is formed integrally with the internal gear and the inner member is formed integrally with the casing.

9. The apparatus according to claim 1, further comprising:
a motor having an armature rotation shaft;
a driving shaft disposed coaxially with the armature rotation shaft;
a sun gear formed on the armature rotation shaft;
an internal gear coaxial with the armature rotation shaft and surrounding the peripheral surface of the sun gear;
planetary gears engaging the sun gear and the internal gear; and
a planetary gear-supporting cylinder rotatably supported by the driving shaft and supporting the planetary gears such that the planetary gears rotate on the axes thereof,
wherein the outer member is formed on the planetary gear-supporting cylinder and the inner member is formed on the driving shaft.

10. The apparatus according to claim 1, wherein:
the annular groove crosses the locking concavity, the annular groove having a radial depth deeper than that of the locking concavities; and the resilient member includes a resilient ring fitted in the annular groove, the other periphery of the resilient ring being located between a top and a bottom of the locking concave.

11. The apparatus according to claim 10, wherein:

an additional annular groove is formed at an axially spaced apart location on the outer periphery of the inner member; and an additional resilient ring is fitted in the additional annular groove the resilient ring and additional resilient ring contacting axial ends of the roller.

12. The apparatus according to claim 10, wherein:

the resilient ring has an end part axially extending beyond the axial end of the roller; and an outer peripheral surface of the end part is in contact with the outer member so that the resilient ring is restricted from deforming radially outwardly.

13. The apparatus according to claim 10, further comprising:

a biasing member disposed in the wedge-shaped groove to bias the roller toward the shallow side, wherein the resilient ring is set to be non-deformable relative to a biasing force of the biasing member.

14. The apparatus according to claim 10, further comprising:

a motor having an armature rotation shaft; and a driving shaft driven by a torque transmission from the armature rotation shaft, wherein the outer member and the inner member are placed between the armature rotation shaft and the driving shaft.

15. An apparatus comprising:

an outer member and an inner member rotatable relative to each other and opposed to each other with a predetermined interval in a radial direction therebetween;

a wedge-shaped groove formed on one of an inner peripheral surface of the outer member and an outer peripheral surface of the inner member such that the depth of the wedge-shaped groove increases from one side to the other side in a circumferential direction:

a roller movably accommodated in the wedge-shaped groove for connecting the outer member and the inner member with each other at a shallow side of the wedge-shaped groove so as to transmit a torque and for disconnecting the outer member and the inner member from each other at a deep side of the wedge-shaped groove:

a locking concavity formed on another of the inner peripheral surface of the outer member and the outer peripheral surface of the inner member for locking the inner roller thereto when the outer member and the inner member are connected with each other;

a resilient member disposed on said another of the inner peripheral surface of the outer member and the outer peripheral surface of the inner member for shifting the roller to a position at which the roller does not contact a radial top of the locking concavity when the outer member and the inner member are disconnected from each other;

a pair of annular grooves formed circumferentially on the outer peripheral surface of the inner member, each annular groove having a radial depth gradually becoming deeper from an axial end of the inner member;

wherein the resilient member includes resilient metal rings resiliently deformable to be received in each annular groove.

16. The apparatus according to claim 15, wherein:

the resilient metal rings each have an inside part and an outside part axially extending inwardly and outwardly with respect to the axial end of the roller; and radially outer peripheral surfaces of the inside parts are held in contact with the roller so that only the inside parts of the resilient rings are deformed by the roller.

17. An apparatus comprising:

an outer member and an inner member rotatable relative to each other and opposed to each other with a predetermined interval in a radial direction therebetween;

a wedge-shaped groove formed on an inner peripheral surface of the outer member such that the depth of the wedge-shaped groove increases from one side to the other side in a circumferential direction;

a roller movably accommodated in the wedge-shaped groove for connecting the outer member and the inner member with each other at a shallow side of the wedge-shaped groove so as to transmit a torque and for disconnecting the outer member and the inner member from each other at a deep side of the wedge-shaped groove;

a locking concavity formed on the outer peripheral surface of the inner member for locking the inner roller thereto when the outer member and the inner member are connected with each other; and a resilient member disposed on the outer peripheral surface of the inner member for shifting the roller to a position at which the roller does not contact a radial top of the locking concavity when the outer member and the inner member are disconnected from each other.

18. The apparatus according to claim 17, wherein the resilient member is disposed to keep the roller away from a radial bottom of the locking concavity when the roller is received in the locking concavity so that the outer member and the inner member are connected with each other.

19. The apparatus according to claim 17, wherein:

at least one additional wedge-shaped groove is formed on the inner peripheral surface of the outer member, the wedge-shaped groove and the at least one additional wedge-shaped groove forming a plurality of wedge-shaped grooves, each groove in said plurality of wedge-shaped grooves having a corresponding roller movably accommodated therein;

at least one additional locking concavity is formed circumferentially on the outer peripheral surface of the inner member, the locking concavity and the at least one additional locking concavity forming a plurality of locking concavities; and the number of the locking concavities in said plurality of locking concavities is greater than the number of rollers in said plurality of rollers.

20. The apparatus according to claim 17, wherein the roller is disposed to disengage from the locking concavity due to resiliency of the resilient member when a torque greater than a predetermined amount is applied in a torque transmission direction.

21. The apparatus according to claim 17, further comprising:

an annular groove formed on the outer peripheral surface of the inner member, wherein the resilient member includes a resilient ring accommodated in the annular groove.

22. The apparatus according to claim 17, further comprising at least one additional resilient member, the resilient member and the at least one additional resilient member forming a plurality of resilient members and being disposed at a plurality of locations spaced apart from one other in the axial direction of the outer member and the inner member such that the plurality of resilient members contact at least both axial sides of the roller.

23. The apparatus according to claim 17, further comprising:

an annular groove formed circumferentially on the outer peripheral surface of the inner member in a manner to cross the locking concave, the annular groove having a radial depth deeper than that of the locking concave;

wherein the resilient member includes a resilient ring fitted in the annular groove, the other periphery of the resilient ring being located between a top and a bottom of the locking concave.

24. The apparatus according to claim 23, wherein:

an additional annular groove is formed at an axially spaced apart location on the outer periphery of the inner member; and an additional resilient ring is fitted in the additional annular groove, the resilient ring and additional resilient ring contacting axial ends of the roller.

25. The apparatus according to claim 23, wherein:

the resilient ring has an end part axially extending beyond the axial end of the roller; and an outer peripheral surface of the end part is in contact with the outer member so that the resilient ring is restricted from deforming radially outwardly.

26. The apparatus according to claim 23, further comprising:

a biasing member disposed in the wedge-shaped groove to bias the roller toward the shallow side, wherein the resilient ring is set to be non-deformable relative to a biasing force of the biasing member.

27. The apparatus according to claim 23, further comprising:

a motor having an armature rotation shaft; and a driving shaft driven by a torque transmission from the armature rotation shaft, wherein the outer member and the inner member are placed between the armature rotation shaft and the driving shaft.

\* \* \* \* \*